May 23, 1944.　　　R. HORNING　　　2,349,730
TUBULAR CONTAINER
Filed Jan. 21, 1941
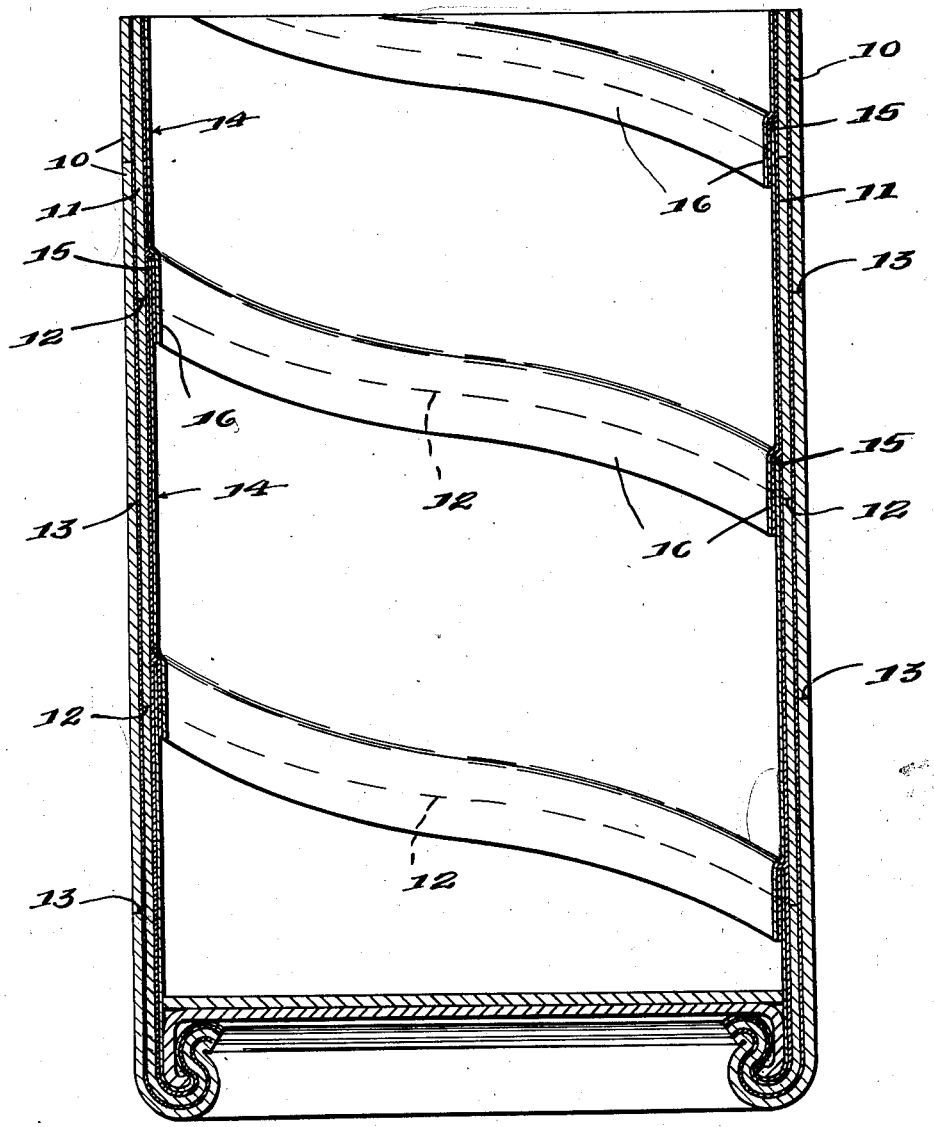
INVENTOR.
BY Raymond Horning
Bradell Thompson
ATTORNEYS.

Patented May 23, 1944

2,349,730

UNITED STATES PATENT OFFICE 2,349,730

TUBULAR CONTAINER

Raymond Horning, Fulton, N. Y., assignor to Oswego Falls Corporation, Fulton, N. Y., a corporation of New York Application January 21, 1941, Serial No. 375,316

2 Claims. (Cl. 229—4.5)

This invention relates to paper containers of the type wherein the body member of the container is of tubular formation consisting of a plurality of layers of paper wound in spiral formation. Such containers are today manufactured in large volume and wherein the tubular body member consists of one or more layers of relatively thick or heavy paper and an inner liner formed of two or more layers of relatively thin impervious material such as processed paper, or parchment, to render the side wall of the container impervious for certain products, particularly those of an unctuous nature.

In addition to the inner liner layer of parchment, the container is rendered more or less impervious by the coating of glue or adhesive between the respective layers making up the side wall of the container. Due to the possibility of the liner having small perforations which permit the contents of the container to seep into the outer layers of the body member, particularly through the seam or joint of the outer layers, it is customary to form the liner of two or more layers of parchment with the seam of one layer arranged remote from the seam of the other, all whereby there are at least two layers of parchment or lining material extending throughout the length of the container in order to have a double thickness of the lining material covering the seam or joint of the inner layer of heavier paper making up the side wall member. The cost of this specially processed lining material adds materially to the cost of the container, and the employment of two or more layers throughout the entire length of the container makes this construction prohibitive in many instances.

This invention has as an object a container of the type referred to embodying a construction wherein only a single layer of lining material is employed, but is so wound as to provide a double thickness of lining material over the joint or seam in the inner layer of the heavier body material.

The invention consists in the novel features and in the combinations and constructions hereinafter set forth and claimed.

In describing this invention, reference is had to the accompanying drawing which is a vertical sectional view of a container embodying my invention.

The laminated body member is here shown as being made up of outer and inner layers 10, 11 of relatively thick paper-board to provide proper rigidity and stiffness to the container. The layers 10, 11 are so wound that the joint or seam 12 of the inner layer 11 is arranged substantially midway between the seams or joints 13 of the outer layer 10, as is conventional in the tube winding art.

The inner liner 14 is formed of relatively thin sheet material which is impervious to the products for which the container is intended to be used. This material may be metallic foil, but in many instances parchment will serve the purpose. The web or strip forming the liner 14 is of appreciable greater width than the strip forming the inner layer 11, and the liner is so wound that the adjacent edges 15, 16 thereof are arranged in overlapping relation, as distinguished from the abutting relation in the case of the outer layers 10, 11, and with this overlap arranged in register with and overlapping the seam 12 of the inner layer 11. With this arrangement, the seam 12 is protected by a double layer of lining material. However, this overlapping of the liner ply is only for a relatively short distance and thereby effects a substantial saving in this material in comparison with previous containers in which the double ply lining material extends throughout the length of the container.

It will be understood that the various layers or plies are coated with a suitable glue or adhesive during the winding process, whereby the outer layers 10, 11 are securely bound together, and the liner layer 14 is securely bound to the layer 11, and that the overlapping portions 15, 16 are in like manner pasted together.

What I claim is:

1. A tubular container having a side wall formed of a plurality of spirally wound layers of fibrous material adhesively secured together and a single inner layer of thin impervious material spirally wound, with the adjacent edges thereof arranged in overlapping relation, and said overlap being arranged in register with and overlapping the seam of the inner layer of fibrous material.

2. A tubular container having a side wall formed of a spirally wound outer ply of fibrous material and an inner ply of thin impervious material spirally wound with the adjacent edges of said inner ply arranged in overlapping relation, and said overlap being arranged in register with and overlapping the seam of said outer ply.

RAYMOND HORNING.